(12) United States Patent
Wang et al.

(10) Patent No.: US 10,124,715 B2
(45) Date of Patent: Nov. 13, 2018

(54) SMART LIGHT CONTROL SYSTEM

(71) Applicant: Keeper Technology Co., Ltd., New Taipei (TW)

(72) Inventors: Wen-Fu Wang, New Taipei (TW); Ying-Wei Kuo, New Taipei (TW)

(73) Assignee: Keeper Technology Co., Ltd., New Taipei (TW)

( * ) Notice: Subject to any disclaimer, the term of this patent is extended or adjusted under 35 U.S.C. 154(b) by 0 days.

(21) Appl. No.: 15/892,636

(22) Filed: Feb. 9, 2018

(65) Prior Publication Data

US 2018/0272924 A1 Sep. 27, 2018

(30) Foreign Application Priority Data

Mar. 22, 2017 (TW) .............................. 106109541 A

(51) Int. Cl.
*H05B 37/02* (2006.01)
*B60Q 1/14* (2006.01)
*G01J 1/44* (2006.01)
*G01J 1/04* (2006.01)

(52) U.S. Cl.
CPC .......... *B60Q 1/1423* (2013.01); *G01J 1/0422* (2013.01); *G01J 1/44* (2013.01); *B60Q 2300/056* (2013.01); *B60Q 2300/314* (2013.01); *B60Q 2300/42* (2013.01); *G01J 2001/4446* (2013.01)

(58) Field of Classification Search
CPC .. G01J 1/0422; G01J 1/44; B60Q 1/04; H05B 37/0209
See application file for complete search history.

(56) References Cited

U.S. PATENT DOCUMENTS

| | | | |
|---|---|---|---|
| 6,282,309 B1* | 8/2001 | Emery | G01N 21/95607 356/237.2 |
| 2003/0001074 A1* | 1/2003 | Chiasson | B60H 1/0075 250/203.4 |
| 2007/0268481 A1* | 11/2007 | Raskar | G01J 1/42 356/218 |
| 2010/0019157 A1* | 1/2010 | Furlan | G01N 21/6452 250/363.01 |
| 2012/0293309 A1* | 11/2012 | Spiro | F21S 2/00 340/12.32 |
| 2015/0352229 A1* | 12/2015 | Brill | A61B 5/0071 424/9.6 |
| 2017/0155818 A1* | 6/2017 | Bonnet | H04N 5/2254 |

* cited by examiner

*Primary Examiner* — Douglas W Owens
*Assistant Examiner* — Syed M Kaiser
(74) *Attorney, Agent, or Firm* — C. G. Mersereau; Nikolai & Mersereau, P.A.

(57) ABSTRACT

A smart light control system includes a light source device and a controller. The light source device has a plurality of transparent parts and a plurality of sensors, and the sensors are separately disposed beside a light source, and the sensors correspond to the transparent parts in terms of position, wherein a channel is formed for light to pass through between each sensor and its corresponding transparent part, and in addition, the controller is connected with the sensors The sensors send sensed signals to the controller according to the brightness of light beams, and the brightness of the light source is adaptively adjusted by the controller so as to achieve the purpose of improving the control efficiency and safety of the light source through the smart control.

21 Claims, 4 Drawing Sheets

SMART LIGHT CONTROL SYSTEM

CROSS REFERENCE TO RELATED
APPLICATION(S)

This non-provisional application claims the benefit under 35 U.S.C. § 119(e) to Patent Application No. 106109541 filed in Taiwan on Mar. 22, 2017, which is hereby incorporated in its entirety by reference into the present application.

BACKGROUND OF THE INVENTION

1. Field of the Invention

The present invention relates to a control system, especially a smart light control system.

2. Description of the Prior Arts

Conventional lamps are difficult to adjust the number of light sources and the light emitting angle. For example, vehicle headlights are difficult to make such adjustments efficiently and as a result of that, the light beams from the headlights will shine directly into the eyes of the people in front of the vehicle, causing a temporary vision blackout and incurring the chances of accidents.

SUMMARY OF THE INVENTION

In view of the problems existing in the conventional lamps, the present invention provides a smart light control system which is capable of adaptively adjusting the brightness according to the brightness of the light source and the surrounding brightness, so as to improve the control efficiency and safety.

In order to achieve the above objectives, the technical solution adopted is to apply the aforementioned smart light control system which includes the following:

a light source device having a plurality of transparent parts and a plurality of sensors separately disposed beside a light source, wherein the sensors correspond to the transparent parts in terms of position, wherein a channel is formed between each of the sensors and its corresponding transparent part;

a controller connected to the sensors;

wherein the sensors transmit sensed signals to the controller based on brightness of light beams, and the controller adaptively adjusts the brightness of the light source according to the sensed signals.

Based on the structure in the aforementioned smart light control system, the surrounding light beams are allowed to get into the light source device through the transparent parts, and when light beams pass through the channels, based on the brightness of the light beams, the controller will adaptively adjust the brightness of the light source so as to achieve the purpose of improving the control efficiency and safety of the light source through the smart control.

Other objectives, advantages and novel features of the invention will become more apparent from the following detailed description when taken in conjunction with the accompanying drawings.

DETAILED DESCRIPTION OF THE
PREFERRED EMBODIMENTS

The following, with the drawings and the preferred embodiment of the present invention, further illustrates the technical means that the present invention adopts to achieve the intended purpose.

Figure 1:
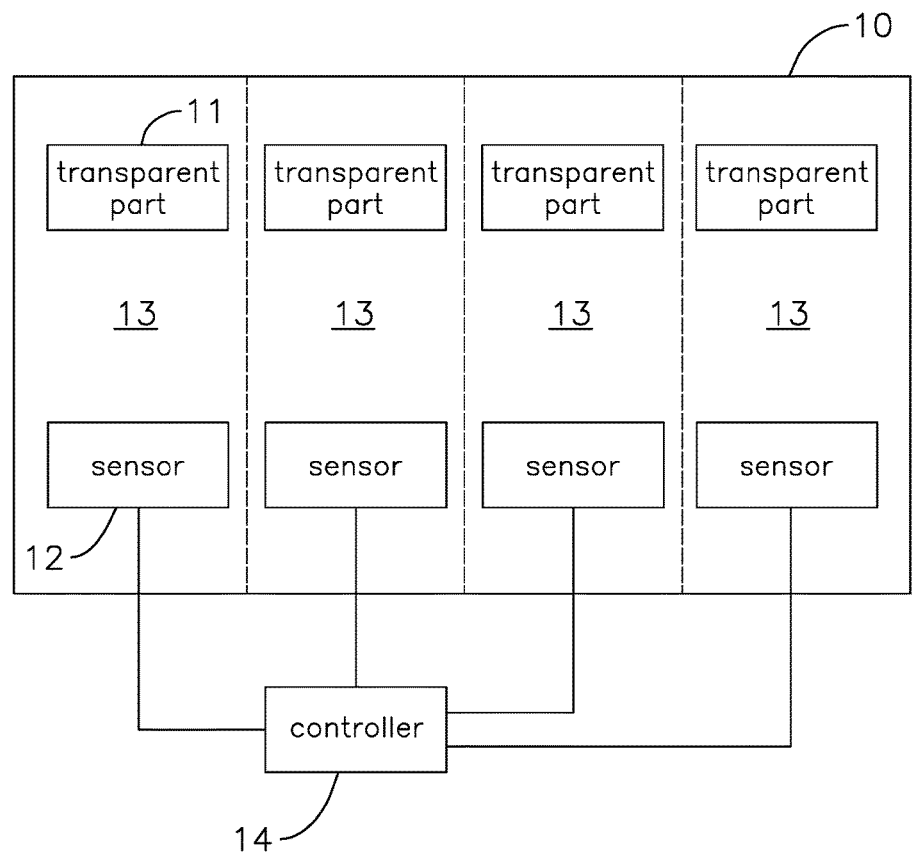
FIG. 1 shows a system block diagram of a first preferred embodiment of the present invention.

Regarding the first preferred embodiment of the present invention, with reference to FIG. 1, the smart light control system includes mainly a light source device 10 which further includes a plurality of transparent parts 11 and a plurality of sensors 12 which are disposed beside a light source, and each sensor 12 corresponds to a respective transparent part 11 in terms of position, wherein for light to pass through, a channel 13 is formed between each sensor and its corresponding transparent part, and a controller 14 is connected with the sensors 12. The sensors 12 send sensed signals to the controller 14 according to the brightness of light beams, and the brightness of the light source is adaptively adjusted by the controller 14.

By way of allowing the light source device 10 to pass the surrounding light beams through the transparent parts 11 to its internal channels 13, when the light beams pass through the channels 13 with their brightness sensed by the sensors 12, the sensors 12 will send the sensed signals to the controller 14 according to the brightness of the light beams, and the controller 14 will adaptively adjust the brightness of the light source based on the brightness of the light beams, so as to achieve the purpose of improving the control efficiency and safety of the light source through the smart control.

In this preferred embodiment, each sensor 12 may include a photosensitive resistor disposed in front of the light source. When the photosensitive resistor receives light beams, its resistance will increase when the brightness of the light beams get brighter, and as the resistance of the photosensitive resistor gets larger, the current flowing through the photosensitive resistor gets smaller, thus the controller 14 will lower the brightness of the light source, and vice versa: when the light beams get dimmer, the controller 14 will increase the brightness of the light source. The transparent parts 11 are disposed on a sidewall of the light source device 10. In this preferred embodiment, the transparent part 11 may include an opening, and a lens may further be disposed on the opening.

Figure 2:
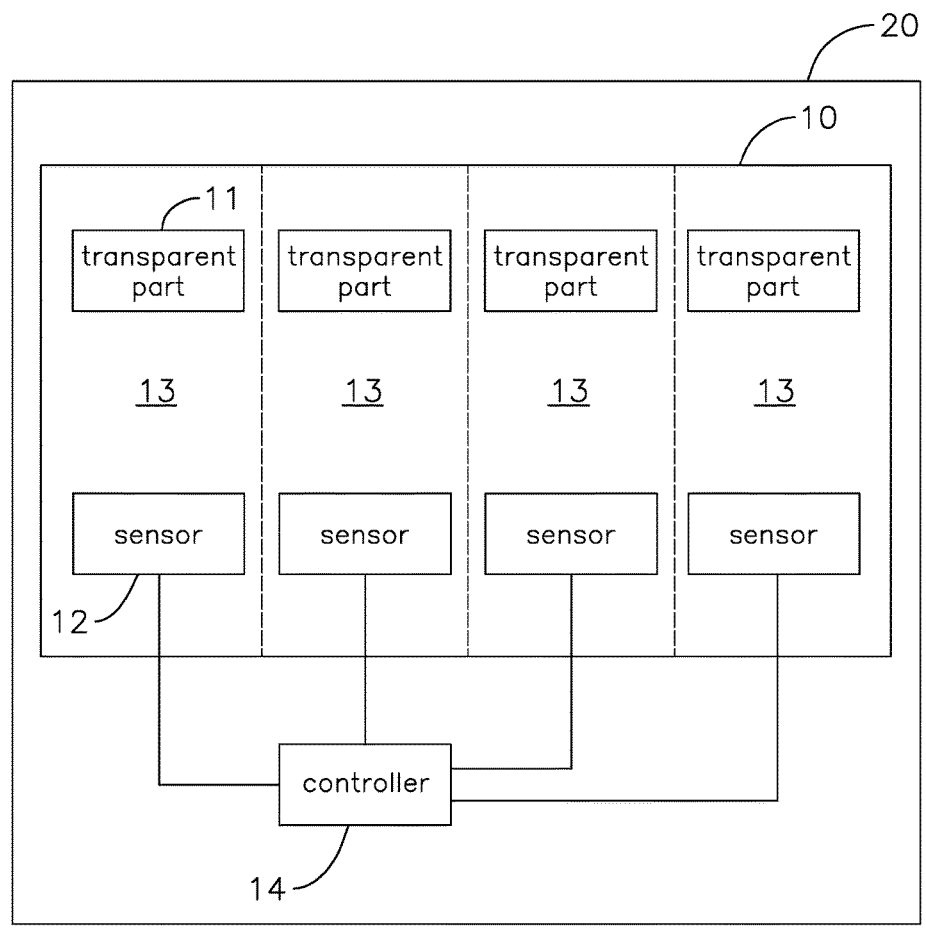
FIG. 2 shows a system block diagram of a second preferred embodiment of the present invention.

Regarding the second preferred embodiment of the present invention, with reference to FIG. 2, the technical contents of the second preferred embodiment are similar to those of the first preferred embodiment. However, in this embodiment, a transparent lamp casing 20 is further provided, and the lamp casing 20 has an internal receiving space therein accommodating the light source 10 and the controller 14. When the lamp casing 20 is in use (for example, the lamp casing is used as a headlight), the surrounding light beams or the light beams from the oncoming vehicle can pass through the lamp casing 20 and enter the transparent parts 11 and get sensed by the sensors 12 so as to allow the controller 14 to adaptively adjust the brightness of the light source according to brightness of the light beams.

Figure 3:
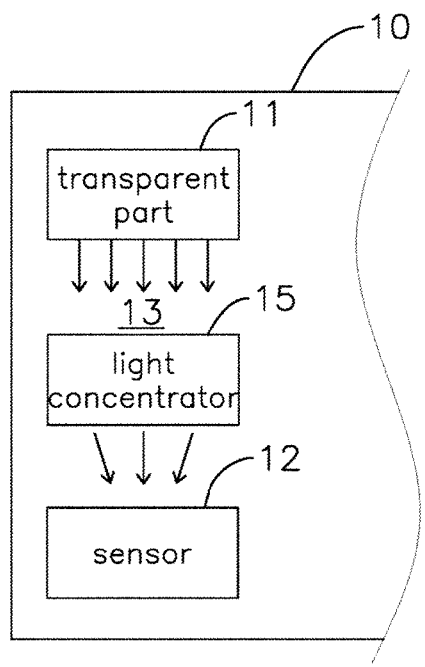
FIG. 3 shows a local system block diagram of a third preferred embodiment of the present invention.

Regarding the third preferred embodiment of the present invention, with reference to FIG. 3, the technical contents of the third preferred embodiment are similar to those of the previously mentioned embodiments; however, in this embodiment, a light concentrator 15 is further provided in the channels 13 which are formed between the transparent parts 11 and the sensors 12. The light concentrator 15 can effectively guide light beams so that the light beams can be focused on the most sensitive portion of the sensors 12, and that will help improve the precision of the smart light control system of this invention. In this embodiment, when the sensors are the aforesaid photosensitive resistors, as the central portions of the photosensitive resistors are more sensitive compared with the side portions of the photosensitive resistors, to avoid limitations due to the less sensitive portions, the light concentrator 15 will effectively guide most of the light beams to focus on the more sensitive portions of the photosensitive resistors.

In this preferred embodiment, the light concentrator 15 can be a light guide, a light collecting lens and a reflective cup.

Figure 4:
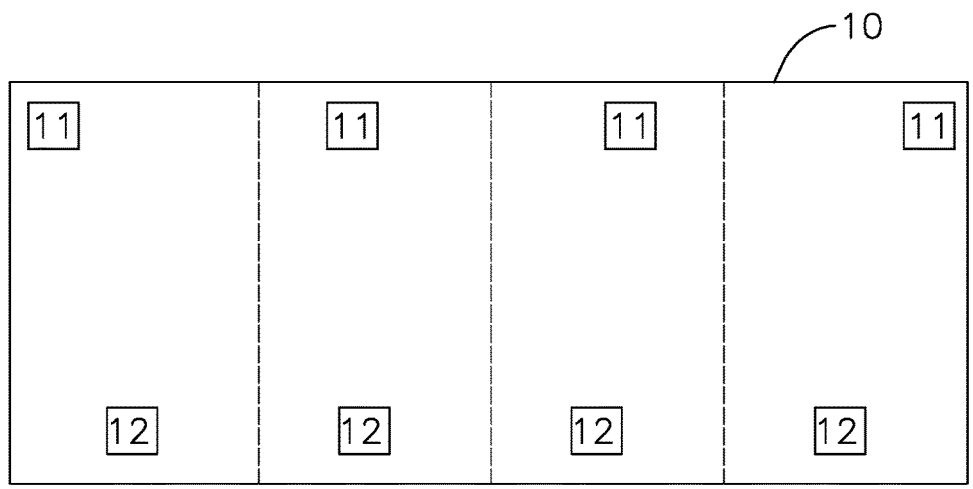
FIG. 4 shows a system block diagram of a fourth preferred embodiment of the present invention.

Regarding the fourth preferred embodiment of the present invention, with reference to FIG. 4, the technical contents of the fourth preferred embodiment are similar to those of the previously mentioned embodiments; however, in this embodiment, the transparent parts 11 are disposed at different positions inside of the light source device 10. In this embodiment, the light source device 10 has a plurality of channels 13 in it, and the aforesaid transparent parts 11 and the sensors 12 are disposed separately, so as to receive light beams from all directions. For example, the transparent part 11 of a first channel is disposed at a first position, the transparent part 11 of a second channel is disposed at a second position, the transparent part 11 of a third channel is disposed at a third position, the transparent part 11 of a fourth channel is disposed at a fourth position, and so forth.

What is claimed is:

1. A smart light control system including:
   a light source device having a plurality of transparent parts and a plurality of sensors separately disposed beside a light source, wherein the sensors correspond to the transparent parts in terms of position, wherein a channel is formed between each of the sensors and its corresponding transparent part, such that a plurality of the channels are formed inside of the light source device and the transparent parts and the sensors are separately disposed, wherein each channel has a transparent part, and the transparent parts of the channels are disposed at different positions;
   a controller connected to the sensors;
   wherein the sensors transmit sensed signals to the controller based on brightness of light beams, and the controller adaptively adjusts brightness of the light source according to the sensed signals.

2. The system as claimed in claim 1, wherein each sensor includes a photosensitive resistor disposed in front of the light source.

3. The system as claimed in claim 1, wherein the light beams received by the sensors are from surrounding light or from oncoming vehicles.

4. The system as claimed in claim 1 further comprising a transparent lamp casing, wherein the light source device and the controller are disposed inside the transparent lamp casing.

5. The system as claimed in claim 1, further comprising a transparent lamp casing, and the transparent parts disposed on a sidewall of the light source device.

6. The system as claimed in claim 5, wherein each transparent part includes an opening.

7. The system as claimed in claim 6, wherein a lens is disposed on the opening.

8. The system as claimed in claim 1 further comprising a plurality of light concentrators each respectively disposed in the channels.

9. The system as claimed in claim 2 further comprising a plurality of light concentrators each respectively disposed in the channels.

10. The system as claimed in claim 3, further comprising a plurality of light concentrators each respectively disposed in the channels.

11. The system as claimed in claim 4, further comprising a plurality of light concentrators each respectively disposed in the channels.

12. The system as claimed in claim 5, further comprising a plurality of light concentrators each respectively disposed in the channels.

13. The system as claimed in claim 6, further comprising a plurality of light concentrators each respectively disposed in the channels.

14. The system as claimed in claim 7, further comprising a plurality of light concentrators each respectively disposed in the channels.

15. The system as claimed in claim 8, wherein the light concentrator includes a light guide, a light collecting lens or a reflecting cup.

16. The system as claimed in claim 9, wherein the light concentrator includes a light guide, a light collecting lens or a reflecting cup.

17. The system as claimed in claim 10, wherein the light concentrator includes a light guide, a light collecting lens or a reflecting cup.

18. The system as claimed in claim 11, wherein the light concentrator includes a light guide, a light collecting lens or a reflecting cup.

19. The system as claimed in claim 12, wherein the light concentrator includes a light guide, a light collecting lens or a reflecting cup.

20. The system as claimed in claim 13, wherein the light concentrator includes a light guide, a light collecting lens or a reflecting cup.

21. The system as claimed in claim 14, wherein the light concentrator includes a light guide, a light collecting lens or a reflecting cup.

* * * * *